(12) United States Patent
Bhavnani

(10) Patent No.: US 7,086,907 B2
(45) Date of Patent: Aug. 8, 2006

(54) RECHARGEABLE IMPLEMENT AND RECHARGING BASE

(75) Inventor: Dilip Bhavnani, Beverly Hills, CA (US)

(73) Assignee: Sun Most, LLC, Commerce, CA (US)

( * ) Notice: Subject to any disclaimer, the term of this patent is extended or adjusted under 35 U.S.C. 154(b) by 0 days.

(21) Appl. No.: 11/008,051

(22) Filed: Dec. 8, 2004

(65) Prior Publication Data

US 2006/0121787 A1 Jun. 8, 2006

(51) Int. Cl.
*H01R 25/00* (2006.01)

(52) U.S. Cl. .......................... 439/638; 320/2; 320/111; 439/919

(58) Field of Classification Search ............... D13/144; 320/2, 111; 439/638, 315, 488–491, 919, 439/131
See application file for complete search history.

(56) References Cited

U.S. PATENT DOCUMENTS

| 5,075,615 A | * | 12/1991 | Dantis | 320/111 |
| 5,648,712 A | * | 7/1997 | Hahn | 320/111 |
| 6,495,988 B1 | * | 12/2002 | Liao | 320/111 |
| 6,792,263 B1 | * | 9/2004 | Kite | 455/412.1 |
| 6,809,943 B1 | * | 10/2004 | Lanni | 363/144 |
| 6,938,867 B1 | * | 9/2005 | Dirks | 248/314 |

* cited by examiner

*Primary Examiner*—Michael C. Zarroli
(74) *Attorney, Agent, or Firm*—The Soni Law Firm

(57) ABSTRACT

The invention is a recharger device having an efficiently designed base charging unit and at least one rechargeable handheld implement, which also serves as an advertising means. The base unit has two electrical prongs on the rear surface and at least one orifice on at least one outer surface of the base unit, each of which lies completely within the surface where it lies. The base unit is shaped and the electrical prongs are positioned and oriented such that when the recharging base is inserted into one socket of a common two socket electrical outlet, the second socket is not blocked by the base unit, thereby permitting both sockets to be fully utilized.

11 Claims, 5 Drawing Sheets

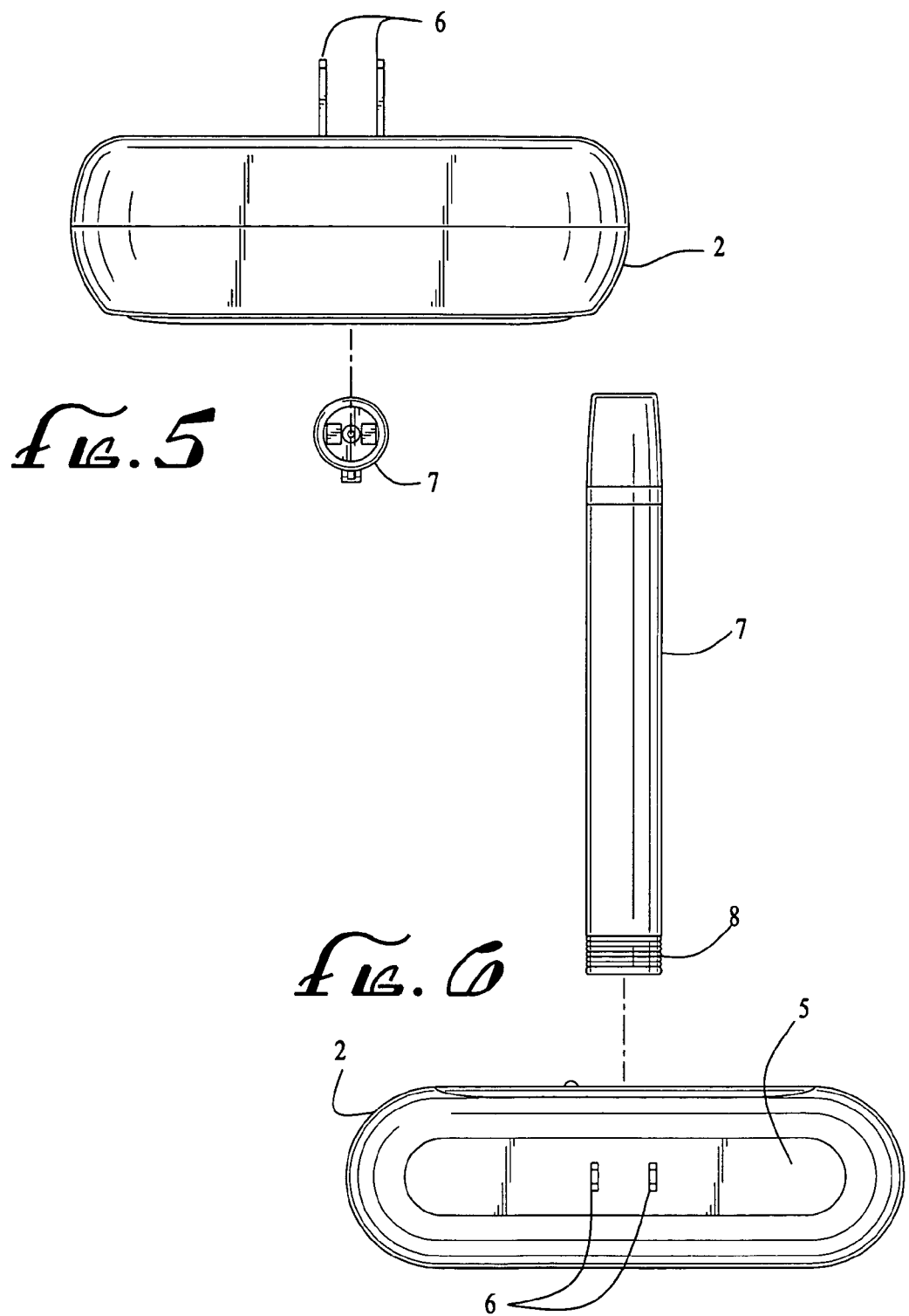

RECHARGEABLE IMPLEMENT AND RECHARGING BASE

BACKGROUND OF THE INVENTION

1. Field of the Invention

The present invention relates to a rechargeable device which plugs directly into a standard two outlet wall electrical jack. More specifically, the present invention relates to a rechargeable device which is configured in a shape such that its insertion directly into one of the female jacks of a common wall electrical outlet will not block access to the second female jack of the outlet. While the present invention is contemplated for use with a rechargeable flashlight such as in a medical examination room, the possibilities for use of this rechargeable device are limitless. This base unit configuration could be used for virtually any cordless rechargeable device, including, but not limited to power tools, drills, screwdrivers, dental tools, medical examination lights and tools and many other hand held implements.

The present invention also relates to advertising means for presenting a business' message by affording one or more surface of the recharger for imprinting advertising.

2. Description of the Prior Art

A variety of rechargeable devices are well known in the prior art. These devices typically utilize either a recharging base with a cord which plugs into the wall outlet or a large and bulky recharging base unit which plugs directly into an outlet. The devices which include a plug and cord attached to a stationary charging base are inherently disadvantageous, as the cords are susceptible to fraying and failure and the base unit would then typically be placed on a table, desk or other surface, thereby limiting the logistical locations for its use. For example, in a medical examination or emergency treatment area, there may not be a table nearby and any work top space for storing tools and devices is scarce.

A second type of recharging devices are those which use a base recharging unit which plugs directly into a wall electrical outlet. These products, however, are typically large, bulky and boxy shaped. When inserted into one outlet of a two outlet wall electrical jack, these units are sized and shaped such that both outlets are blocked by the base unit and/or its recharging implement, regardless of whether inserted in the top or bottom jack of the outlet.

What is lacking in the existing art is a rechargeable device which is of a shape and configuration such that it occupies only one of the two electrical outlets and when installed, does not block, but instead permits access to the second outlet. What is also lacking is such a device which also provides the benefit of serving as an advertising means whereby businesses can display and expose their message on the recharger for publication to users and others who will see the device.

SUMMARY OF THE INVENTION

An object of the present invention to provide a recharger device for one or more hand held implements which is configured to be of a particular size and shape such that when installed directly into one outlet, typically the top one, of a conventional wall dual electrical jack, the user may still gain full access to the second outlet jack as neither the base charging unit nor the rechargeable implement(s) will block the user's access.

Still another object of this invention is to provide a rechargeable base unit into which multiple recharging implements may be concurrently inserted for recharging. Having multiple implements readily available provides for quick change of the implement in the event of longer desired use, or if each implement is used for a distinctly different purpose. The availability of multiple implements improves efficiency and duration of use.

A further object of the invention is to provide an advertising means for businesses to display and expose their message on the recharger for publication to users and others who will see the device.

BRIEF DESCRIPTION OF THE DRAWINGS

FIG. 5 is a bottom plan view of the rechargeable device of FIG. 1;

FIG. 6 is a back elevation view of the device of FIG. 1;

DETAILED DESCRIPTION OF THE PREFERRED EMBODIMENT

Figure 1:
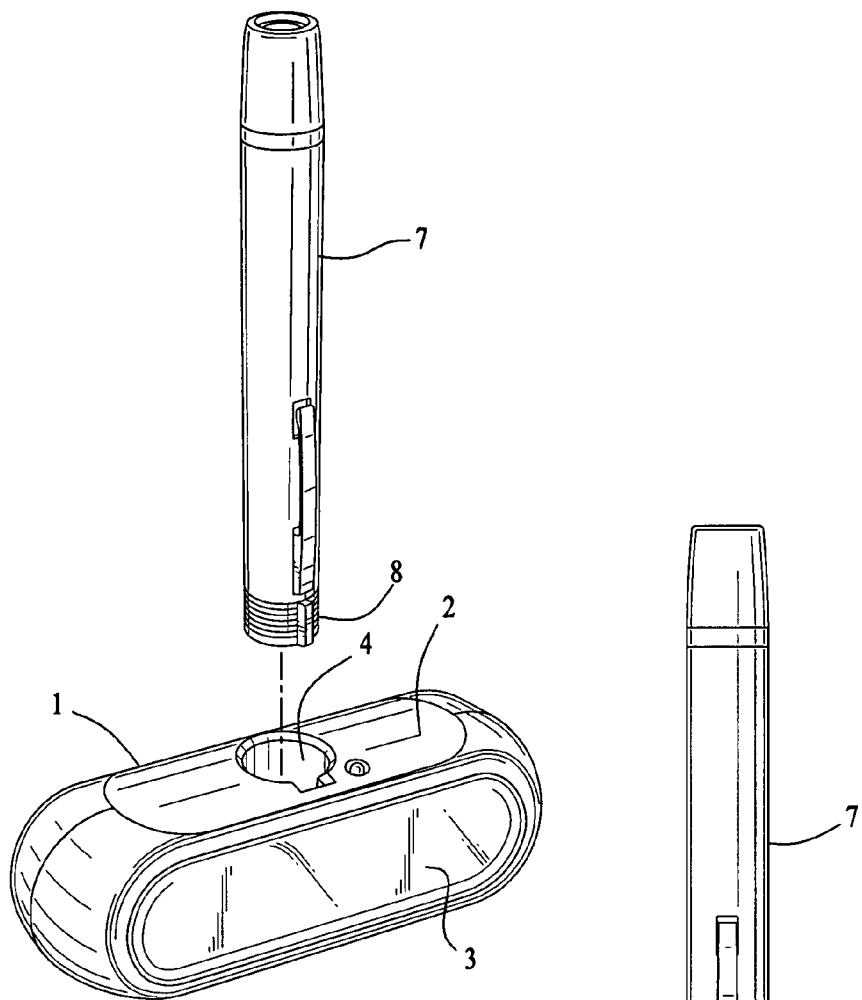
FIG. 1 is a top front perspective view of a rechargeable device.
Figure 2:
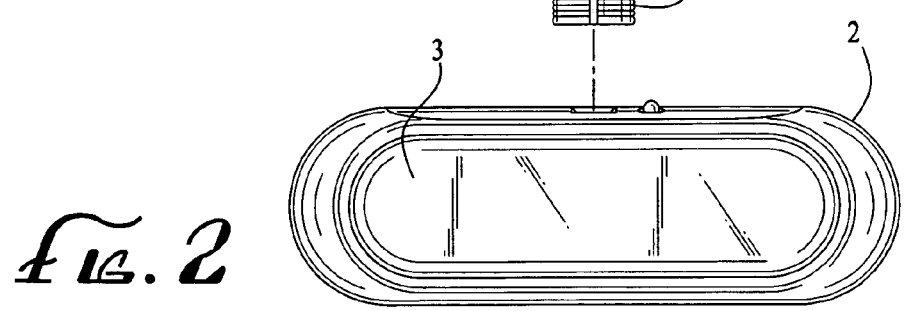
FIG. 2 is a front elevation view of the rechargeable device of FIG. 1.
Figure 3:
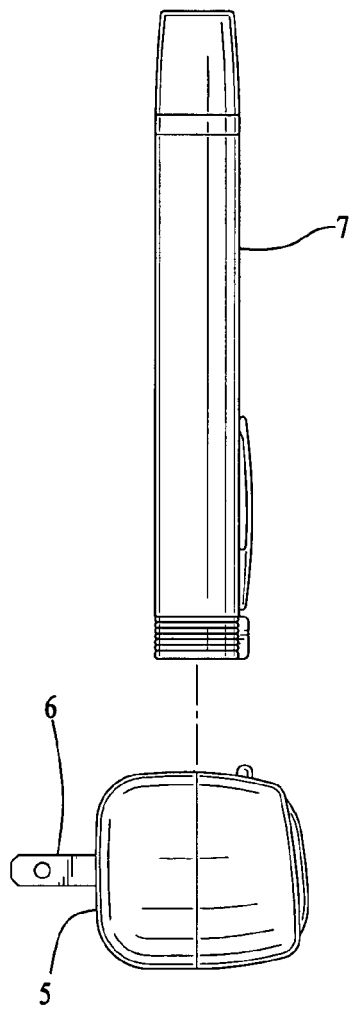
FIG. 3 is a side elevation view of the rechargeable device of FIG. 1.
Figure 4:
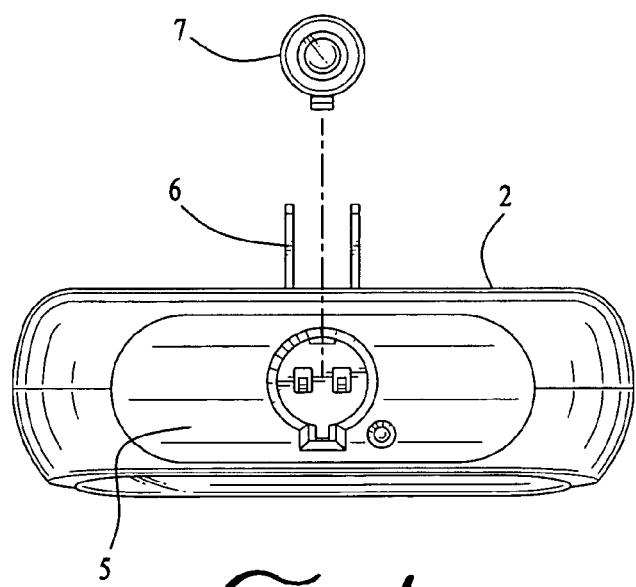
FIG. 4 is a top plan view of the rechargeable device of FIG. 1.
Figure 7:
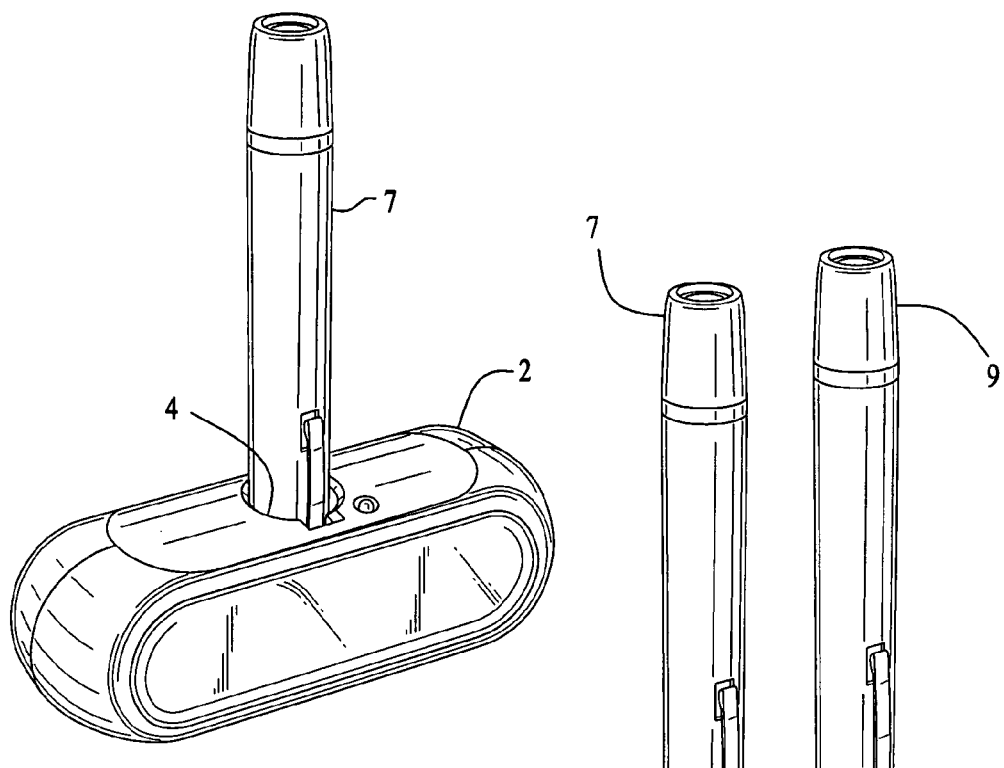
FIG. 7 is another top front perspective view of the rechargeable device of FIG. 1

As shown in FIGS. 1 and 2, a preferred embodiment of the invention is that of a recharging base unit (1) which includes an elongated body section (2), a front face (3) and at least one implement recharging orifice (4), into which a rechargeable hand held implement (7) would be inserted for recharging. The functions of and interface between the orifice (4) and the recharging implement (7) are well known to those skilled in the art. As further shown in FIGS. 3 through 6, this preferred embodiment also includes a back face (5), from which the male electrical prongs (6) project. These prongs (6) will be inserted into one outlet, typically the top outlet, of a common two outlet electrical wall jack to facilitate the recharging cycle. The internal electronics and components of such a recharging unit are well known to those skilled in the art.

The preferred embodiment of the invention further includes one or more recharging implements (7) which are inserted into the orifice (4) of the base unit (1) for recharging. FIGS. 1 through 7 and FIG. 9 show the implement (7) in the configuration of a small flashlight, of the size and type commonly used in medical examination rooms. The hand held implement (7) would further include a male end (8), which would be inserted into the orifice (4) in order to recharge the implement. Hand held implements, such as the exam flashlight light, are well known to those skilled in the art. While the present invention contemplates use with a flashlight as the rechargeable implement, the possible scope of implements for use in this rechargeable device configuration may include virtually any cordless rechargeable device, including, but not limited to power tools, drills, screwdrivers, dental tools, medical examination lights and tools and many other hand held implements.

Figure 8:
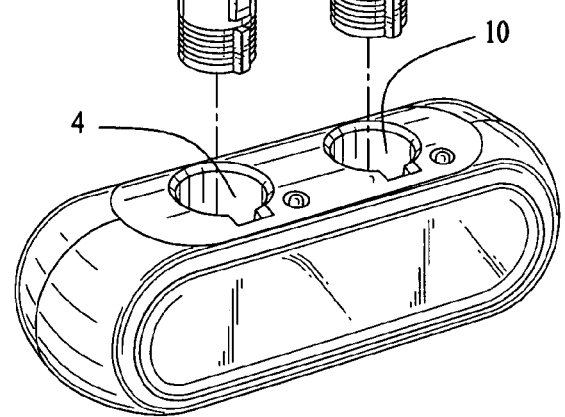
FIG. 8 is a top front perspective view of an alternative embodiment of a rechargeable device of FIG. 1

FIG. 8 shows the rechargeable device in an embodiment which includes two hand held implements (7) and (9), inserted into two orifices (4) and (10) of the base unit (1). Again, while FIG. 8 depicts each of the implements as a flashlight, the invention contemplates embodiments in which each of the two or more included implements could be either identical implements or could be a different type of implement. An example of different implements which may be inserted into the recharging base would be one as a flashlight and the second as a dental tool. Such hand held implements would be well known to those skilled in the art.

Figure 9:
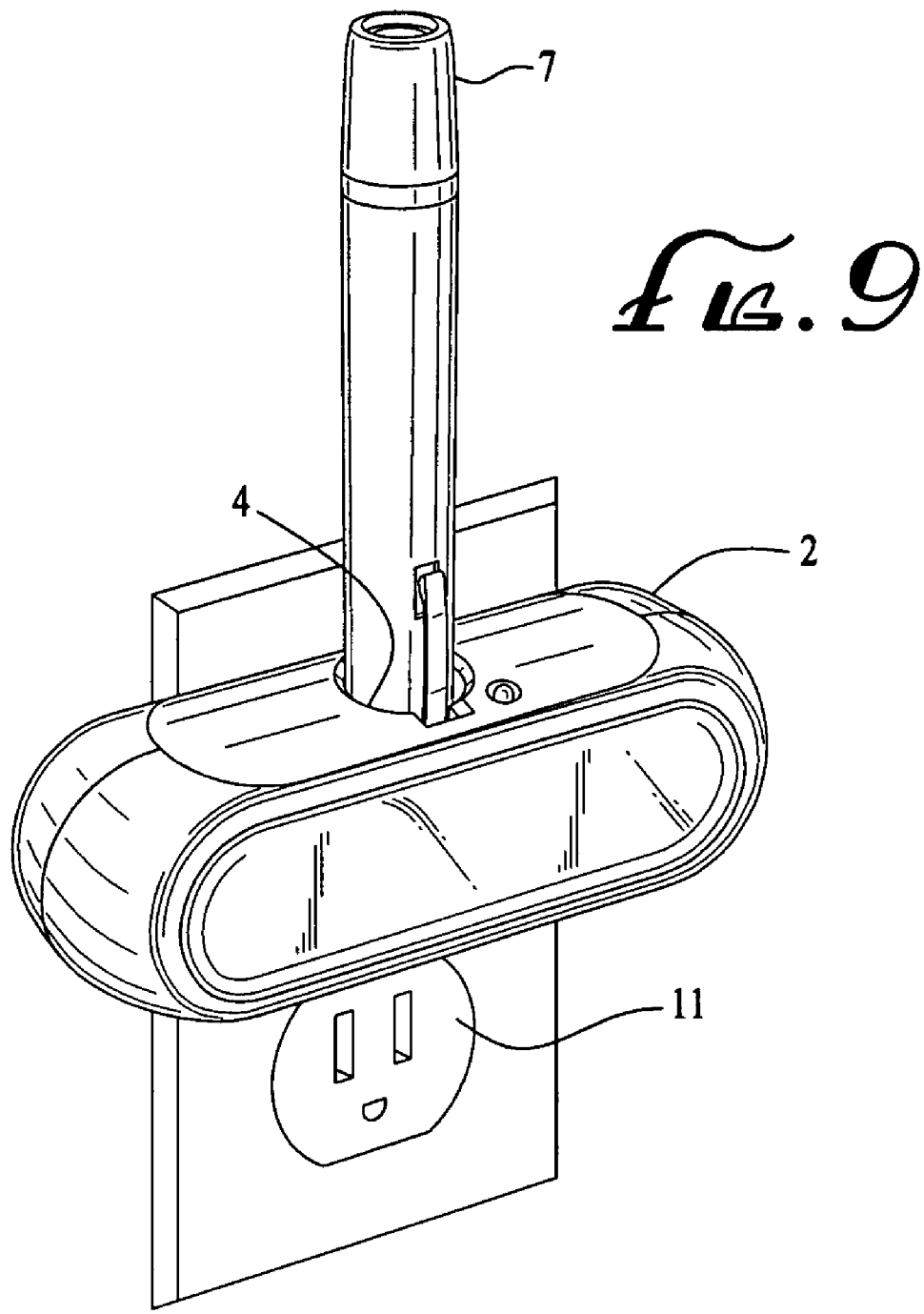
FIG. 9 is a top front perspective view of the rechargeable device of FIG. 1, shown as it would be inserted into a common electrical outlet.

FIG. 9 shows a preferred embodiment of the invention as it would be inserted into the top outlet of a common two outlet electrical wall jack (11). As shown in FIG. 9, when the base unit (1) is fully inserted into the top outlet and implements (7) are inserted into the orifice(s) (4), the second, or in the case of this preferred embodiment, the bottom outlet is free to accept another plug or electrical device.

In yet another preferred embodiment, advertising or graphical material is imprinted on at least one face of the base unit (1). As depicted in FIGS. 1 and 2, the front face (3) would be an appropriate location for this material. Advertising or graphical materials may also be imprinted on the outer surface of the hand held implement (7) and/or (8). The purpose of advertising or graphical material imprinted upon one or more of these surfaces would be to utilize the recharging device as a method of advertising or promotion.

What is claimed is:

1. A recharger device comprising:
   at least one rechargeable handheld implement; and
   a recharging base unit, said base unit comprising:
      at least one orifice defined by at least one outwardly facing surface, said at least one orifice being configured to securably receive said at least one rechargeable handheld implement, said at least one implement being retainable in an inverted position during recharging, said at least one orifice defining a respective closed periphery on said outwardly facing surface, and
      two male electrical prongs protruding from a rear surface of said base unit for insertion into a common two-socket electrical outlet for recharging, said base unit being shaped and said electrical prongs being positioned and oriented on said rear surface of said base unit such that when said recharger device is fitted into either of the two sockets of the electrical outlet, the other outlet becomes available for access by other electrical instruments.

2. The recharger device of claim 1, wherein said at least one rechargeable handheld implement is selected from the group consisting of lighting implement, writing implement, drill, power tool, dental tool, and medical examination tool.

3. The recharger device of claim 1, wherein the number of said at least one rechargeable handheld implement two.

4. The recharger device of claim 1, further including printed or graphical imprinting on at least one outwardly facing surface of the base unit for the purpose of advertising or promotion.

5. The recharger device of claim 1, further including printed or graphical imprinting on at least one surface of said at least one rechargeable handheld implement for the purpose of advertising or promotion.

6. A method of advertising or promotion comprising the step of imprinting printed or graphical material on at least one outer surface of a recharger device having a recharging base unit and at least one rechargeable handheld implement, said base unit comprising:
   at least one orifice on at least one outwardly facing surface into each of which said rechargeable handheld implement is inserted for recharging, each of said orifice defining a closed periphery on said outwardly facing surface; and male electrical prongs protruding from a rear surface of said base unit for insertion into a common two-socket electrical outlet for recharging, said base unit being shaped and said electrical prongs being positioned and oriented on said rear surface of said base unit such that when said recharger device is fitted, with proper orientation, into one of the two sockets of said electrical outlet, the other socket becomes available for access by other electrical instruments.

7. A recharger device comprising:
   two or more rechargeable implements wherein at least one of said rechargeable implements is a different type of implement than the remainder of implements; and
   a recharging base unit, said base unit comprising:
      two or more orifices on at least one outwardly facing surface into which said rechargeable implements are inserted, one per each orifice, for recharging; and
      male electrical prongs protruding from a rear surface of said base unit for insertion into a common two-socket electrical outlet for recharging,
   said base unit being shaped and said electrical prongs being positioned and oriented on said rear surface of said base unit such that when said recharger device is fitted, with proper orientation, into one of the two sockets of said electrical outlet, the other socket becomes available for access by other electrical instruments.

8. The recharger device in claim 7, wherein at least one of said rechargeable implements is a handheld implement.

9. The recharger device in claim 7, wherein each of said orifices defines a closed periphery on said outwardly facing surface.

10. The recharger device in claim 7, further including printed or graphical material imprinted on at least one outwardly facing surface of said base unit for advertising and promotion.

11. The recharger device in claim 7, further including printed or graphical material imprinted on at least one surface of said rechargeable implements for advertising and promotion.

* * * * *